March 29, 1966  L. SCHMITZ  3,243,272

FLASH-BACK ARRESTER FOR WELDING INSTALLATIONS

Filed April 12, 1963

INVENTOR.
Ludwig Schmitz
BY 3,243,272
FLASH-BACK ARRESTER FOR WELDING
INSTALLATIONS
Ludwig Schmitz, Weberstrasse 22, Dusseldorf, Germany
Filed Apr. 12, 1963, Ser. No. 273,121
2 Claims. (Cl. 48—192)

The present invention relates to flash-back arresters, especially for use in connection with autogenous welding installations. Fash-back arresters serve the purpose to prevent the flash back of the flame. They may be arranged at three locations within the welding installation namely either directly at the handle of the torch or in the hose or at the gas bottle.

It is an object of the present invention to provide a flash-back arrester for the above mentioned purpose, which will eliminate the heretofore customary hydraulic seal with flash-back arresters.

It is another object of this invention to provide a flash-back arrester as set forth in the preceding paragraph which will, at least for long periods of time, not require any servicing.

It is also an object of the present invention to provide a flash-back arrester, especially for autogenous welding installations, which will not require any sealing material.

It is still another object of this invention to provide a flash-back arrester which will be free from burnable or movable parts and can easily be converted to a flash-back arrester for use at the gas bottle, in the hose or at the handle.

A still further object of the present invention consists in the provision of a flash-back arrester in form of a cartridge which can easily be handled by any unskilled person.

It is also an object according to the present invention to provide a flash-back arrester, especially for autogenous welding installations, which will not require a special check valve thereby resulting in a small, light and easy to handle arrangement.

It is still another object of this invention to provide a flash-back arrester as set forth above which, while being highly reliable and requiring a minimum of space, will be able when a flash back occurs to retain combustion residues.

These and other objects and advantages of the invention will appear more clearly from the following specification in connection with the accompanying drawing, in which:

FIG. 1. illustrates a longitudinal section on a somewhat enlarged scale of a flash-back arrester with a threaded pipe connection at one end thereof and a house receiving connection on the other end thereof.

*General arrangement*

Figure 1:
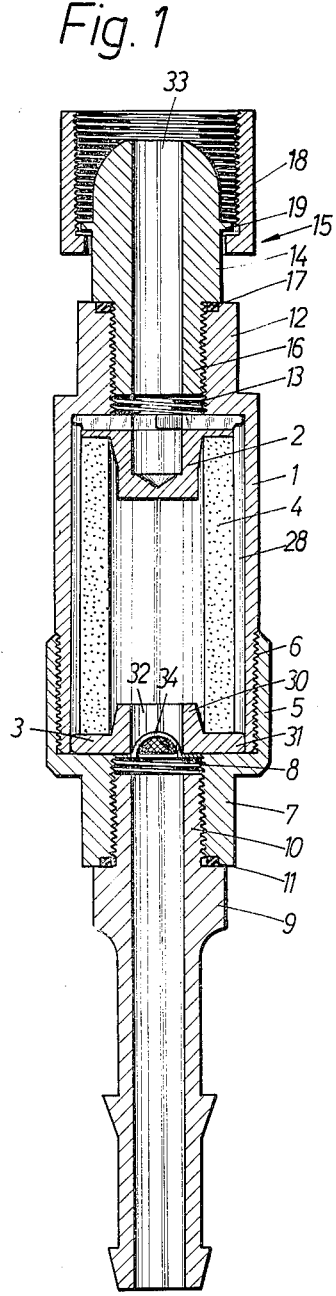

The arrangement according to the present invention is characterized primarily in that it comprises a tube of porous sintered metal arranged within and evenly spaced from a housing and having coaxially arranged thereto in spaced relationship to each other a flame-absorbing disc and a through-flow disc. According to a particularly advantageous design of the present invention, the said discs together with said tube are held in the housing by means of a box nut, while in the oppositely located ends of said housing and box nut two identical threaded bores are provided for selectively receiving a hose connecting member or a connecting member for a screwed pipe connection.

With an embodiment which has proved practical and highly successful, the flame-absorbing disc and the through-flow disc are provided with conical extensions which are gastight inserted into the ends of the above mentioned sintered metal tube while having flanged portions extending over the end faces of said tubes. In order that as large a surface as possible of the sintered metal tube be kept free for the passage of the fuel gases, the conical extensions merely engage the respective adjacent edge portions of the bore of the tube at the end faces thereof. In this way, a relatively small portion of the tubular wall will be in direct contact with the conical extensions. The flame-absorbing disc has its outer end face provided with substantially radial recesses or bores near the circumference thereof and has a central pocket hole which is so deep that the thus formed cup-shaped portion is entirely or partially located within the tube and receives and retains a portion of the combustion residues at flash backs. The through-flow disc has a central bore for the passage of the fuel gases and may be provided with a screen or sieve for preventing the entry of foreign bodies into the inner chamber of the tube.

*Structural arrangement*

Referring now to the drawing in detail, the flash-back arrester shown therein comprises a housing 1 having substantially coaxially arranged in said housing and radially evenly spaced therefrom a tube 4 of porous sintered metal, for instance, the said tube 4 is held in its coaxial position with regard to said housing by means of a flame-absorbing disc 2 and a through-flow disc 3 respectively arranged at opposite ends of said tube 4. The tube 4 together with discs 2 and 3 is secured in said housing 1 by means of a box nut 5 screwed upon an outer thread 6 in said housing 1. Box nut 5 has an offset section 7 of smaller diameter than the housing portion surrounding tube 4, and is provided with an inner thread 8. Screwed into said inner thread 8 is a hose-receiving and securing member 9 the threaded portion 10 of which threadedly engages the thread 8. The member 9 is sealed with regard to the box nut 5 by means of a seal 11.

The other end of housing 1 has an offset section 12 with an inner threaded bore 13 which thread 13 preferably is of the same type as thread 8 in the box nut 5. The thread 13 is threadedly engaged by a threaded extension 16 of a connecting member 14 of a screw pipe connection 15. The connection 14 is sealed relative to the housing 1 by means of a seal 17. A box nut 18 of the screw pipe connection 15 engages an annular collar 19 of the connecting member 14 and serves for connecting the flash-back arrester with the burner (not shown). The hose receiving member 9 serves for connecting the flash-back arrester with the hose leading to the gas producer or gas bottle, for instance to an acetylene developer, an acetylene or oxygen bottle or the like.

Figure 2:
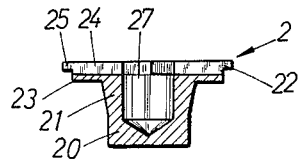
FIG. 2 is a longitudinal section through the flame absorbing disc.
Figure 3:
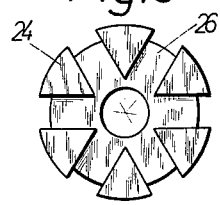
FIG. 3 is a top view of FIG. 2.

The flame-absorbing disc 2 shown by itself in FIGS. 2 and 3, comprises a substantially cylindrical portion 20 which merges with a cone 21. The cone 21 is provided with a circular flange, generally designated 22, which comprises a lower section 23 and an upper section 24 with a larger diameter section 25. The upper section 24 is provided with radially extending recesses 26 which extend into the lower portion 23. The central portion of the flame-absorbing disc 2 has a pocket-hole 27 which is open at that side of disc 2 which faces the burner, so that the thus formed cup-shaped portion extends into the tube 4. The purpose of the pocket-hole 27 consists in catching the major portion of the combustion residues when a flash-back occurs, and to prevent said residues from being deposited on or in tube 4. The flame-absorbing disc 2 consists of a softer material as, for instance, aluminum, than the sintered metal making up tube 4. Moreover, that portion of disc 2 where the cone 21 merges with the flange portion 23 is slightly larger than the inner diameter of tube 4, so that tube 4 will, when disc 2 is inserted into tube 4, slightly bite into said portion and engage the latter only along a small inner edge thereof. In this way, only a relatively minor portion of the tubular wall is directly covered by the conical portion 21 of disc 2, so that pressure losses will be avoided which otherwise would require an extension of the tube.

Figure 4:
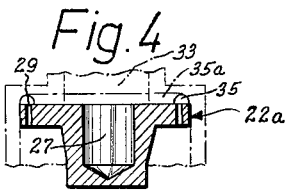
FIG. 4 is a longitudinal section through a modified flame-absorbing disc.
Figure 5:
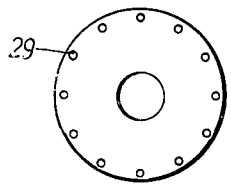
FIG. 5 is a top view of FIG. 4.

The flame-absorbing disc of FIGS. 4 and 5 differs from the disc according to FIGS. 2 and 3 in a different design of the connecting pass between the burner connection and the annular chamber 28 between housing 1 and tube 4. Instead of the protruding flange portion 25 and the recesses 26, the disc 22a is provided with bores 29 near the circumference of the disc flange. In this way, the flange 22 forming a cover closure plate can be designed stronger. In order in this instance to establish a communication between the annular chamber 28 and bore 33 of connecting member 14 through the bores 29, the section 12 adjacent the flange 22a is provided with an annular groove 35 with which communicate radial passages 35a likewise in the housing portion 12 and leading into the bore 33.

The through-flow disc 3 comprises a conical extension 30 and a flange portion 31 forming a cover plate. The central portion of disc 3 is provided with a bore 32. The conical extension 30, similar to the extension of disc 2, extends into the bore 4a of tube 4 and rests only at the lower inner edge (with regard to FIG. 1) so that also in this instance a relatively small portion of the wall of the tube is directly covered by the conical extension 30.

When assembling the flash-back arrester according to the invention, first the conical extensions 21 and 30 of discs 2 and 3 respectively are introduced into bore 4a of tube 4. Thereupon tube 4 with discs 2 and 3 is inserted in housing 1 so that the protruding marginal portions 25 and 31 of discs 2 and 3 respectively will rest with only slight play on the inner wall of the housing 1. Subsequently, the box nut 5 is screwed onto housing 1 and tightened down. As a result thereof, the conical extensions 21 and 30 are not only pressed firmly into tube 4 but the tube 4 so-to-speak digs itself into the discs 2 and 3 inasmuch as the latter consist of a softer material than tube 4. This continues until the flame-absorbing disc 2 and the through-flow disc 3 have their flat closure plates 22 and 31 respectively resting against plane end faces of tube 4. In this way, tube 4 will not only be precisely centered within the housing 1 but a double seal is obtained, viz. on one hand by engagement of the conical extensions 21 and 30 with the inner edges of the tube ends, and on the other hand by engagement of the flanges 22 and 31 with the flat end faces of tube 4. This double seal will be obtained without any sealing material which, at the high temperatures occurring in connection with flash-backs, would become useless and thereby jeopardize the entire flash-back arrester. The flash-back cartridge obtained by a proper assembly as outlined above, does not require any disassembly and reassembly where it is to be used, in other words, regardless of whether it is to be used at the handle of the burner, in the hose, or at the gas bottle. This is of particular importance when the equipment is handled by unskilled laborers, so that any assembly errors will be impossible. If the flash-back arrester cartridge is to be connected, for instance, to the handle of a burner, according to FIG. 1, the screw pipe connection 15 is screwed into housing 1 and the hose receiving connecting member 9 is screwed into the box nut 5. By means of the screw pipe connection 15, the flash-back arrester cartridge may be connected to the handle of the burner, and by means of the hose connecting member 9 may be connected to a hose.

If, in another case of employment, the flash-back arrester cartridge is to be connected directly to the gas bottle the connecting portion of which has a thread, it is merely necessary to exchange the screw pipe connection 15 and hose connecting member 9 because the flash-back arrester cartridge is effective in one direction only and, therefore, must not be reversed. If the flash-back arrester cartridge is to be arranged within the hose, hose connecting members 9 are screwed into both ends of said cartridge. In such an instance, however, care is to be taken that the flash-back arrester cartridge is inserted in the prescribed direction, i.e. with the flame-absorbing disc 2 open toward the burner.

The fuel gases employed for welding purposes, as, for instance, acetylene, oxygen, and the like, pass from the hose connecting member 9 into the interior of tube 4 and from there through the wall of tube 4 into the annular chamber 28, and from there through the recesses 26 into the inner bore 33 of the connecting member 14 of the screw pipe connection 15 to the burner.

If, between the burner and the flash-back arrester, an explosive mixture forms which, by ignition, causes a flash-back, the pressure wave of the flash-back first passes into the connecting member 14 and is caught in the pocket-hole 27 of the flame-absorbing disc 2. The major portion of the combustion residues will be deposited in the said pocket-hole. From there, the pressure wave, which is now considerably weakened, passes through the recesses or cutouts 26 into the annular chamber 28. At the latest, within the sintered metal tube 4 the flame will be extinguished, and the pressure wave will be cushioned to such an extent that it will not present any damage for the adjacent conduit portions. In this way, flash-backs of a magnitude of from 60 to 70 atmospheres above atmospheric pressure can be mastered without difficulties, while fifty flash-backs and more may be absorbed.

The flash-back arrester according to the present invention is able to properly and reliably absorb even the heaviest flash-backs which may occur, without the necessity of providing an additional safety device, as, for instance, check-valves or the like. This advantage of the present invention is due primarily to the fact that the conical extensions and the flat flanges or closure plates of discs 2 and 3 assure a reliable seal with regard to pipe 4 so that a proper closure of tube 4 is obtained without the employment of sensitive seals of soft material. At the same time, in view of the pressure of the parts 1 and 5 screwed together, a reliable seal of the two discs 2 and 3 with regard to their engaging surfaces with the housing 1 and the box nut 5, respectively, will be obtained. If desired, the outer end faces of discs 2 and 3 may be secured with regard to parts 1 and 5 by suitable means, as for instance, annular collars and corresponding counter nuts.

The through-flow disc 3 may be equipped with a screen or sieve 34 by means of which the entry of foreign bodies carried by the inflowing gas into the inner chamber of tube 4 will be prevented.

It is, of course, to be understood that the present invention is, by no means, limited to the particular constructions shown in the drawing, but also comprises any modifications within the scope of the appended claims.

What I claim is:

1. In a flashback arrester: a tubular housing having two spaced ends thereof provided with means for respectively receiving first and second conduit means, a tubular member of porous gas permeable material with an axial bore therethrough, said tubular member being mounted within said housing in spaced relationship to the lateral wall thereof so as to confine therewith an annular chamber, a first member having a flange with the major portion of one side thereof resting on one end face of said tubular member, said flange being provided with first passage means formed by substantially radial grooves on that side of said flange which faces away from said bore, said first passage means extending through said flange and leading into said annular chamber, said first member having a pocket-hole open at that end thereof which is adjacent the flange of said first member, said pocket-hole communicating with said grooves and being located at least partially within the confines of said tubular member for receiving at least a portion of combustion residues formed during a flashback, a second member having a flange with the major portion of one side thereof resting on the other end face of said tubular member and being provided with second passage means leading into said bore, said members also being provided with a tapering section connected to the respective flange and extending into the adjacent end of said bore and sealingly engaging the periphery of said bore, the flanges of said first and second members respectively having their peripheral portions protruding radially outwardly beyond the end faces of said tubular member.

2. In a flashback arrester: a tubular housing having two spaced ends thereof provided with means for respectively receiving first and second conduit means, a tubular member of porous gas permeable material with an axial bore therethrough, said tubular member being mounted within said housing in spaced relationship to the lateral wall thereof so as to confine therewith an annular chamber, a first member having a flange with the major portion of one side thereof resting on one end face of said tubular member, said flange being provided with first passage means formed by axial passages extending through said flange near the outer periphery thereof, further passage means including substantially radical grooves on that side of said flange which faces away from said bore, said grooves leading from said axial passage toward the center of said first member, channel means in said first mentioned means and in the center of said first member for establishing communication between conduit means received by said first mentioned means and said grooves, a second member having a flange with the major portion of one side thereof resting on the other end face of said tubular member and being provided with second passage means leading into said bore, said members also being provided with a tapering section connected to the respective flange and extending into the adjacent end of said bore and sealingly engaging the periphery of said bore, the flanges of said first and second members respectively having their peripheral portions protruding radially outwardly beyond the end faces of said tubular member.

References Cited by the Examiner

UNITED STATES PATENTS 1,221,278 4/1917 Bowkus.

FOREIGN PATENTS 160,717 9/1952 Australia.
1,066 1909 Great Britain.
352,302 2/1959 Switzerland.

FREDERICK L. MATTESON, JR., *Primary Examiner.*

MEYER PERLIN, *Examiner.*

H. B. RAMEY, *Assistant Examiner.*